A. M. BARCUS.
COUPLING FOR HOSE AND THE LIKE.
APPLICATION FILED FEB. 25, 1913.
1,117,762.
Patented Nov. 17, 1914.
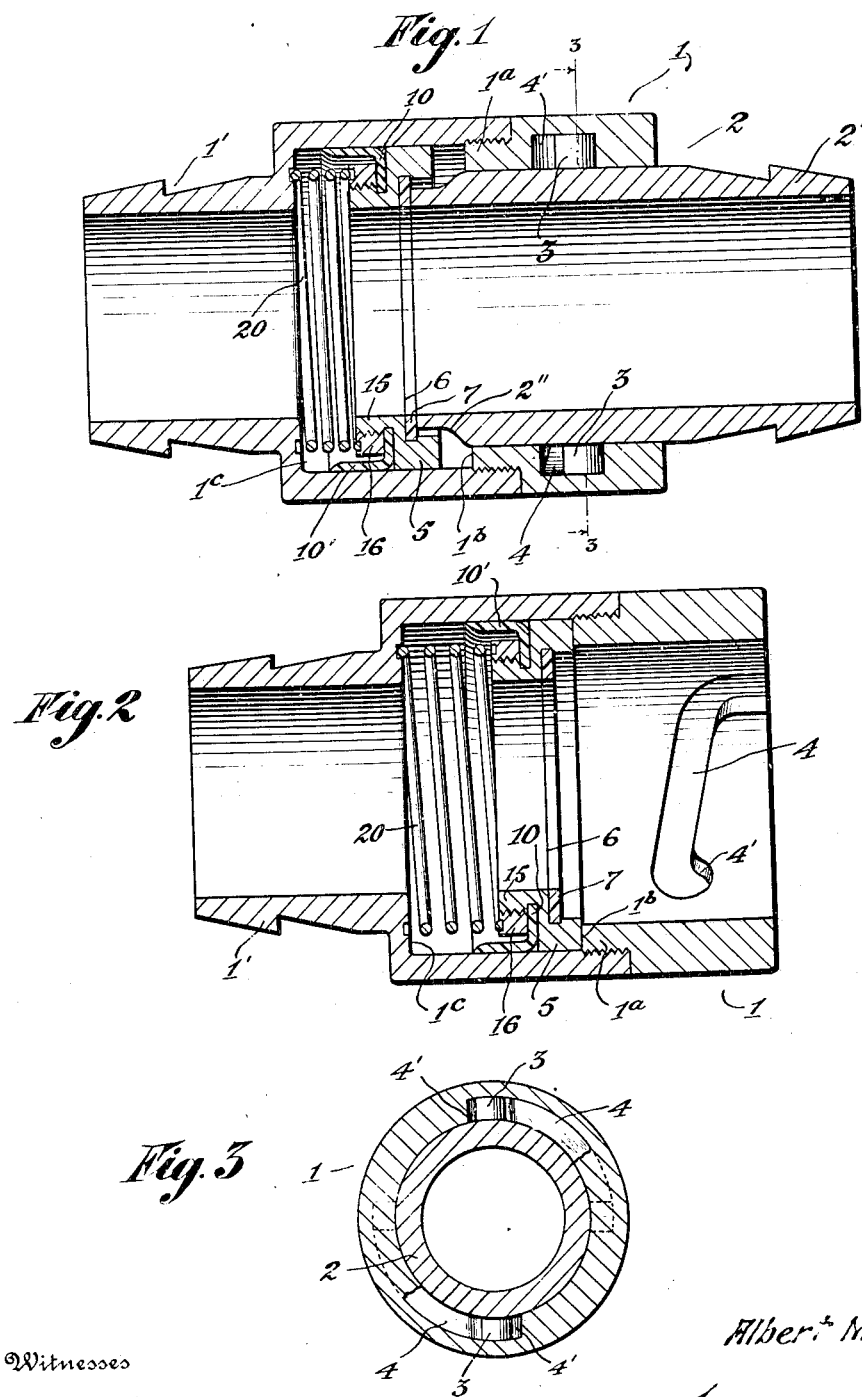
Witnesses
James E. Sproll.
Clara A. Harm
Inventor
Albert M. Barcus.
By
Adams & Brooks
Attorneys

UNITED STATES PATENT OFFICE.

ALBERT M. BARCUS, OF RAYMOND, WASHINGTON.

COUPLING FOR HOSE AND THE LIKE.

1,117,762.  Specification of Letters Patent.  Patented Nov. 17, 1914.

Application filed February 25, 1913. Serial No. 750,582.

*To all whom it may concern:*

Be it known that I, ALBERT M. BARCUS, a citizen of the United States of America, and a resident of the city of Raymond, in the county of Pacific and State of Washington, have invented certain new and useful Improvements in Couplings for Hose and the like, of which the following is a specification.

My invention relates to couplings of the above type, and has for one of its objects to provide a structure wherein the parts can be readily connected and disconnected.

Another object resides in the provision of means for utilizing the pressure of the fluid in obtaining a water tight joint between the coupling parts.

My invention is adapted for connecting one section of hose or other conduit to another section or to a hydrant.

Other objects will be set forth as my description progresses, and those features of construction, arrangements and combinations of parts on which I desire protection, succinctly defined in my annexed claim.

In the accompanying drawing I have illustrated my invention as adapted for connecting two sections of hose.

In the said drawing: Figure 1 is a longitudinal section of the coupling with the parts thereof interlocked. Fig. 2 is a longitudinal section of the outer coupling part, and Fig. 3 is a transverse section on line 3—3 of Fig. 1.

Referring to the drawing by numerals of reference, 1 and 2 indicate outer and inner coupling parts respectively, these being substantially cylindrical and having suitable roughened shanks or extensions 1', 2' for reception of the hose sections, not shown. The inner end portion of part 2 is preferably reduced or tapered, as at 2'', to facilitate its insertion into part 1. Said part 2 is also provided with lugs 3 adapted for riding in cam grooves 4 of part 1, whereby upon partial rotation of one part on the other, the coupling part 2 will be drawn inwardly until said lugs 3 reach depressions 4', occurring at the inner end portions of the grooves. As now considered, coupling part 1 is formed of two sections arranged end to end and one thereof having a threaded annular extension 1ª in threaded engagement with the other section and projecting inwardly from the inner face thereof to provide a shoulder 1ᵇ. Between shoulder 1ᵇ and the opposite end wall 1ᶜ of coupling part 1, I arrange a slide member 5 of open formation, this being provided on one side with a seat 6 for engagement with the adjacent end of coupling part 2. This seat is preferably faced with a packing ring 7, as shown. The opposite side face of slide member 5 is provided with an annular externally threaded boss 15 which like the body proper of member 5 is bored or open for free passage of the water from one coupling part to the other.

Reference numeral 10 indicates a cupped washer seated on slide member 5 about the annular boss 15 thereof, and held thereon by a nut 16. In thus mounting washer 10, the flexible outer edge portion 10' extends lengthwise of coupling part 1 and will be pressed firmly outwardly against the inner face thereof by the water or other fluid.

Reference numeral 20 indicates a spiral spring interposed between wall 1ᶜ and nut 16, the same tending to press slide member 5 toward shoulder 1ᵇ, against which latter the member will rest when the coupling parts are disengaged. This spring serves to hold slide member 5 against the end of coupling part 2 when the fluid pressure is cut off, as when the parts are first coupled, thereby overcoming leakage between the parts during the initial portion of the flow incident to the opening of the cut off valve. Pressure applied to member 5 holds coupling part 2 with its lugs 3 in the depressions 4' of its grooves 4.

Various changes can be made in the minor details of construction, as fall within the scope of my annexed claim.

Having thus described my invention what I claim as new, and desire to secure by Letters Patent of the United States of America, is:—

In a coupling, outer and inner coupling parts the former of which comprises two sections arranged end to end and one having its outer end portion formed with cam grooves and its inner end portion provided with a threaded annular extension threaded in the other section and projecting inwardly from the inner face thereof to provide an internal shoulder, the other section of said outer coupling part being formed in its opposite end portion with a second shoulder opposing the shoulder provided by the annular extension of said first named coupling section, a hollow slide member arranged in said outer coupling part and provided with a packing ring bearing against the inner face thereof, spring means interposed between the second shoulder of said outer coupling part and said slide member, said slide member being arranged between the shoulders of said outer coupling part whereby the first named shoulder thereof will limit movement of the slide member by said spring means, said inner coupling part being insertible in said outer coupling part and normally engaging said slide member and holding the same spaced inwardly from the said first named shoulder of said first named coupling part, and lugs on said inner coupling part adapted for riding in the cam grooves of said outer coupling part, for the purpose specified.

Signed at Raymond, Washington, this 11th day of February, 1913.

ALBERT M. BARCUS.

Witnesses:
 E. S. ROBINSON,
 G. E. FOIDELL.